March 8, 1966   M. SOTO RODRIGUEZ   3,238,931
COMBUSTION SYSTEM FOR INTERNAL COMBUSTION ENGINES
Filed Feb. 25, 1964

# United States Patent Office 3,238,931
Patented Mar. 8, 1966

3,238,931
COMBUSTION SYSTEM FOR INTERNAL
COMBUSTION ENGINES
Manuel Soto Rodriguez, Madrid, Spain, assignor to
Barreiros Diesel, S.A., Madrid, Spain
Filed Feb. 25, 1964, Ser. No. 347,187
Claims priority, application Spain, Feb. 26, 1963,
285,490
5 Claims. (Cl. 123—32)

This invention relates to the combustion system of compression ignition internal combustion engines and more particularly to the arrangement of the precombustion chamber in such engines.

The object of the invention is to provide an arrangement which ensures correct operation, high power, and economy of fuel consumption at high and low speeds as well as ease of starting and absence of noise.

It is well known that a correct mixture of air and fuel is necessary for attaining said conditions, and that it is further necessary to achieve a compromise between the turbulence created in the movement of the air, both in direction and in intensity, and the relative aiming positions of the flow and of the jet. A high turbulence, which promotes the mixing of the fuel and air, nevertheless presents the disadvantage of great heat transfer losses in the walls, resulting in starting troubles, and in antechamber engines they are generally accompanied by a lamination of the gases with large pressure drops between the cylinder and the antechamber on the compression stroke, and between the antechamber and the cylinder on the power stroke, which results in a low efficiency of the engine.

According to the invention, favorable conditions are ensured by providing a cavity in the cylinder head of particular form and dimensions cooperating with a groove in the piston head whereby the flow of the gases from said cavity into said groove is controlled by the form of the bottom closure of said cavity which directs the gases towards the discharge port to the cylinder.

In order that the invention may be clearly understood, a suitable embodiment will now be more fully described with reference to the accompanying drawings, wherein FIG. 1 is a part sectional elevation of a cylinder head and cylinder showing the cavities in the cylinder head and piston head and a flame cup in accordance with the invention;

FIG. 2a is a cross section along line A—A, and

Figure 1:
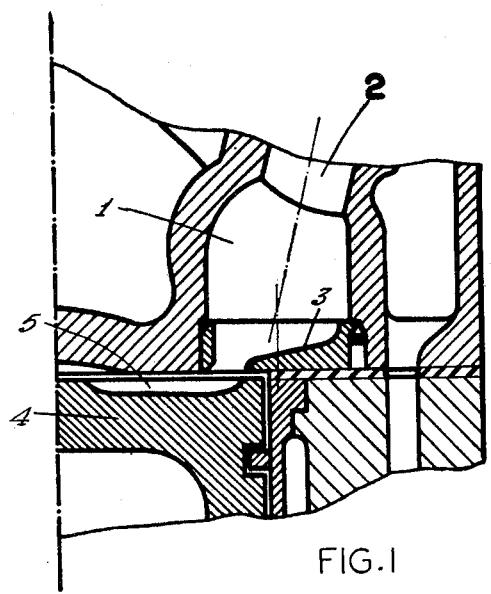

Referring to the drawings and more particularly to FIG. 1, the system of my invention comprises the chamber 1 in the cylinder head opposite the top of the cylinder which chamber is formed by a cavity of a shape described in detail below. A bore of suitable inclination receives the fuel injection nozzle 2. As shown, the fuel is directed towards the center of the bottom of the chamber with a slight shift towards the passageway to the cylinder. In the contact area between the cylinder head and the cylinder block, the cavity 1 is enclosed by a part 3 of the fire deck which is made of an alloy which is resistant to high temperatures and thermal shocks. A suitable material is, for instance, the alloy available in commerce under the name Nimocast.

The chamber 1 has the shape of an elongated body of revolution whereby the total height above the cylinder head plane is about 1 to 1.6 times the diameter of said chamber. The cylindrical center part of the chamber passes into an upper part which has the form of a hemisphere or which may be formed by a flattened or enlarged surface whereby the height of said upper part will be about 0.3 to 0.8 times its diameter. The shape of the lower part is defined by the shape of the part 3 of the fire deck. The total volume of the chamber should be in the range of 30 to 70 percent of the total volume in the cylinder at the top dead center of the piston.

As will be seen from the drawings, the part 3 has an upper face slanting towards the outlet port of the chamber 1 at an angle of inclination of 3 to 20°, and may have a central groove, the maximum depth of which may be, for example, about 3 to 4 mm., to channel the gases towards the outlet port.

The radius of the bottom in the outlet port is in the range of 0.05 to 0.15 times the diameter of the cavity.

Figure 2:
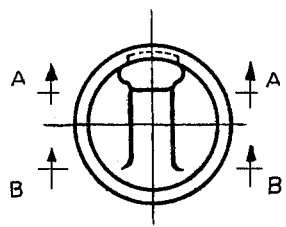
FIG. 2 is a plan view of the port for the discharge of the gases from the precombustion chamber.
Figure 2B:
FIG. 2b is a cross section taken along line B—B of FIG. 2.
Figure 3:
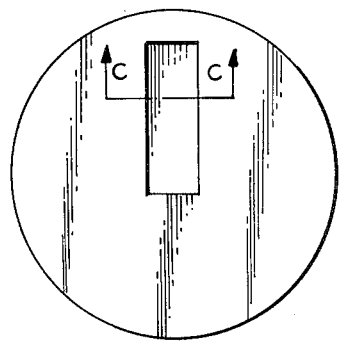
FIG. 3 is a plan view of the groove formed in the piston.
Figure 3A:
FIG. 3a is a partial sectional of the piston taken along line C—C of FIG. 3.

The shape of the bottom of the cavity can be easily seen in the longitudinal section shown in FIG. 1, and in the plan view in FIG. 2 and in the sections of FIGS. 2a and 2b.

The outlet port will be made with small thicknesses therein and may have rounded edges to facilitate the inflow and outflow of gases. The port may have various shapes, preferably the shape shown in FIG. 2 where it is formed by a central approximately rectangular section with rounded corners and with two side lobes to improve the mixture of air and fuel and to promote turbulence in the interior of the chamber. It has a maximum width of 0.40 to 0.65 of the chamber diameter. Its dimensions in radial direction will be 0.15 to 0.35 of the chamber diameter. The central throat of the outlet is in the range of 0.45 to 0.85 of the width of the outlet port.

In the piston 4, there is provided a groove 5 extending from the chamber outlet to approximately the center of the piston, to permit the gases, at the final moment of compression and the first moment of combustion, to pass from the chamber to the space situated in and among the valves and to the space between piston and cylinder head, and to change the direction of the gases in the antechamber.

The groove 5 extends approximately from the lower outer end of part 3 to approximately the center of the piston and is wider than deep whereby the width may vary from $8/10$ of the minimum width of the port in the area of said groove in part 3 to 1.3 times the maximum width of the outlet port. The groove 5 is rectangular in section with rounded corners. Its depth may vary in the range of 0.3 to 0.7 times its width.

The purpose of said piston groove is to provide a path for the gases from the cylinder of the valve cavities to the antechamber in order to prevent erosion of the cylinder and loss of thrust in the movement of the gases and to direct the movement of the air inside said antechamber.

I claim:

1. In a compression ignition internal combustion engine a combustion system comprising a precombustion chamber formed by a cavity having the shape of a body of revolution elongated in the direction of the cylinder, a heat and shock resistant member closing said chamber towards the cylinder and provided with a passageway forming a port to the cylinder, said member overlapping the cylinder block and having an upper surface inclined towards said port and containing a shallow groove directing the gases centrally towards said port, and a groove in the piston head extending from said port to substantially the center of the piston.

2. The system as claimed in claim 1 wherein said port has a rectangular shape with rounded corners and side lobes.

3. The system as claimed in claim 1 wherein said port has a greater width than length.

4. The system as claimed in claim 1 wherein said piston groove has a substantially rectangular section with rounded corners.

5. The system as claimed in claim 1 including means for injecting fuel in the direction towards the center of the bottom of the chamber with a shift slightly towards the said passageway.

References Cited by the Examiner

UNITED STATES PATENTS 2,795,215  6/1957  Holt _____ 123—32.9
2,821,177  1/1958  Holt _____ 123—32.9

FOREIGN PATENTS 1,211,196  10/1959  France.
433,922   8/1935   Great Britain.
904,339   8/1962   Great Britain.
930,498   7/1963   Great Britain.

MARK NEWMAN, *Primary Examiner.*

RICHARD B. WILKINSON, *Examiner.*